US012739569B2

(12) United States Patent
Doyle

(10) Patent No.: US 12,739,569 B2
(45) Date of Patent: Sep. 15, 2026

(54) SHEAR MODE TRANSDUCER AND METHODS

(71) Applicant: Ian M. Doyle, Newport, RI (US)

(72) Inventor: Ian M. Doyle, Newport, RI (US)

(73) Assignee: The United States of America as represented by the Secretary of the Navy

( * ) Notice: Subject to any disclaimer, the term of this patent is extended or adjusted under 35 U.S.C. 154(b) by 366 days.

(21) Appl. No.: 18/419,799

(22) Filed: Jan. 23, 2024

(65) Prior Publication Data

US 2025/0240577 A1 Jul. 24, 2025

(51) Int. Cl.
*H04R 17/00* (2006.01)

(52) U.S. Cl.
CPC ......... *H04R 17/00* (2013.01); *H04R 2217/01* (2013.01)

(58) Field of Classification Search
CPC ....................................................... H04R 17/00
See application file for complete search history.

(56) References Cited

U.S. PATENT DOCUMENTS

| | | | | |
|---|---|---|---|---|
| 5,001,681 A * | 3/1991 | Bertoldi | B06B 1/0603 367/160 |
| 5,948,993 A * | 9/1999 | Ting | G01H 11/08 73/777 |
| 9,219,223 B2 * | 12/2015 | Han | H10N 30/045 |
| 9,910,016 B2 * | 3/2018 | Borigo | G01N 29/07 |
| 2025/0269403 A1 * | 8/2025 | Lim | B06B 1/0215 |

* cited by examiner

*Primary Examiner* — Olisa Anwah
(74) *Attorney, Agent, or Firm* — Jeffry C. Severson

(57) ABSTRACT

Piezoelectric materials are utilized in shear mode deformation to excite longitudinal flexural bending electromechanical motion in a transducer. A single transducer stack comprising a plurality of shear mode piezoelectric material elements are arranged to create a flexural bender bar which can be used for electroacoustic applications. The transducer stack is configured such that adjacent piezoelectric elements have opposite shear mode deformation. Electrodes for positive and negative voltage excitation are applied to parallel faces of the piezoelectric elements. Application of a voltage difference between the electrodes causes the piezoelectric elements to undergo shear strain, wherein one half of the transducer stack expands into tension and the other half contracts into compression, thus inducing longitudinal flexural bending electromechanical motion. Enclosed embodiments provide support structures for utilization of piezoelectric shear mode induced longitudinal flexural bending electromechanical motion.

10 Claims, 7 Drawing Sheets

SHEAR MODE TRANSDUCER AND METHODS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

This invention relates to the use of shear mode deformation in piezoelectric single crystals to excite longitudinal flexure electromechanical motion and the use of such motion in electroacoustic transducers.

(2) Description of the Prior Art

Transducers are materials or devices that convert energy from one form to another. For example, an electro-mechanical transducer allows for the conversion between electrical and mechanical energy. When coupled with a fluid medium such as air or water, an electro-mechanical transducer can convert between electrical and acoustical energy. Human intervention in the field of underwater acoustics is physically possible through the application of transduction devices. The most common artificial method of producing underwater sound for SONAR (SOund Navigation And Ranging) is with an electroacoustic transducer.

In general, piezoelectric electroacoustic transducers make use of piezoelectric materials that are able to develop an electrical polarization proportional to an applied mechanical stress or develop a mechanical strain (deformation) proportional to an applied electric field. One form of piezoelectric material is a single crystal (or monocrystalline) solid, where the crystal lattice in the material is continuous and unbroken to the edges of the sample, with no grain boundaries. In contrast, polycrystalline piezoelectric materials are solids composed of many crystallites of random size and orientation. Relaxor-based piezoelectric single crystal solids have a macroscopic symmetry that is dependent on crystal phase (or material system composition) and a direction of poling in the bulk material, which may be controlled through a technique called domain engineering. In domain engineering, an electric field is applied to a piezoelectric single crystal associating the material to pseudocubic axes of the prototype cubic symmetry, wherein the poling direction automatically defines the three crystallographic axes: the z-axis, the y-axis, and the x-axis. Domain-engineered single crystals may be further modified through a process called coordinate rotation wherein the poled single crystal solid is cut at a coordinate rotation angle (also referred to as a cut direction) to optimize piezoelectric properties.

When piezoelectric single crystals are poled and/or cut at different coordinate rotation angles, they exhibit specific piezoelectric properties. For example, when poled in the $[011]_c$ direction, they show large transverse and longitudinal shear piezoelectric properties. Han in U.S. Pat. No. 9,968,331 teaches a piezoelectric single crystal element that produces shear motion, called the 36-shear mode. That mode allows for a large piezoelectric response with the electric field direction aligned with the poling direction. In contrast, when using other shear mode piezoelectric elements, like the 15-shear or 24-shear modes, the electric field direction is perpendicular to the poling direction, which can cause de-poling under high drive conditions.

One type of underwater electroacoustic transducer design is the bender bar projector, which typically operates at relatively low frequencies (<1000 Hz). The bender bar or flexing beam transducer radiates acoustic energy directly from the surfaces of simply supported piezoelectric beams. The beams or bars are configured in opposing pairs either on a planar surface or in a "barrelstave" configuration. In the conventional bender bar design, two oppositely polarized layers of piezoelectric material (such as lead zirconate titanate (pzt)) are cemented with electrodes therebetween and arranged in such a way that, when a voltage is applied, one layer expands while the other contracts, resulting in a longitudinal-flexure or bending motion. When excited by an alternating electric field, the bars flex about their neutral position and produce an acoustic pressure wave. Conventionally, the bars that comprise this "longitudinal-flexure" mode operate with 31-mode (strain perpendicular to electric field) or 33-mode (strain parallel to electric field) from polycrystalline piezoelectric materials. Bertoldi et al. in U.S. Pat. No. 5,001,681 teaches a single-layer bender bar design. However, the approach therein relies upon double-poled piezoelectric crystal elements, adding complexity to manufacturing thereof.

SUMMARY OF INVENTION

It is therefore a primary object and general purpose of the present invention to teach use of shear mode piezoelectric crystal elements in a shear mode transducer to induce longitudinal flexure electromechanical motion.

To attain the present invention, a device comprising a shear mode transducer is provided. The shear mode transducer generally includes a transducer stack comprising a plurality of shear mode piezoelectric crystal elements arranged in layers. The shear mode piezoelectric crystal elements are poled along a single direction. A first electrode is provided on a first outer face of each shear mode piezoelectric element and a second electrode is provided on a second outer face, the second outer face opposing the first outer face. An application of a voltage difference between the first electrode and the second electrode induces longitudinal-flexure electromechanical motion.

As one example, the layer may be a single layer. The plurality of shear mode piezoelectric crystal elements may be 36-shear mode piezoelectric single crystals. In an exemplary application, the device may be an electroacoustic flexural bender bar.

The shear mode transducer disclosed herein is capable of inducing longitudinal flexure mechanical motion using shear mode piezoelectric crystal elements, and in this way, it simplifies construction of a variety of electroacoustic devices that may be manufactured therefrom. Whereas conventional bender bars comprise two layers of piezoelectric crystals, use of shear mode piezoelectric crystal elements enables forming the transducer in a single layer using piezoelectric crystal elements poled along a single polarization vector. Further, the disclosure teaches applying electrodes to outer surfaces only of the transducer stack, in contrast with conventional bender bars where electrodes are applied on the outside and in between each layer. Moreover, constructing the bender bar from shear mode piezoelectric crystal elements enables manufacturers to select crystals based on electrical, mechanical, or acoustical properties, such as, for example, poling direction, reduced cross-talk, resonance frequency, and power output.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Features of illustrative embodiments may be understood from the accompanying drawings in conjunction with the description. The elements in the drawings may not be drawn to scale. Some elements and/or dimensions may be enlarged or minimized for the purpose of illustration and understanding of the disclosed embodiments.

DETAILED DESCRIPTION

The following description relates to systems and methods for the use of shear mode deformation in piezoelectric single crystals to excite longitudinal flexure electromechanical motion and the application of such motion to electroacoustic transducers.

Figure 1:
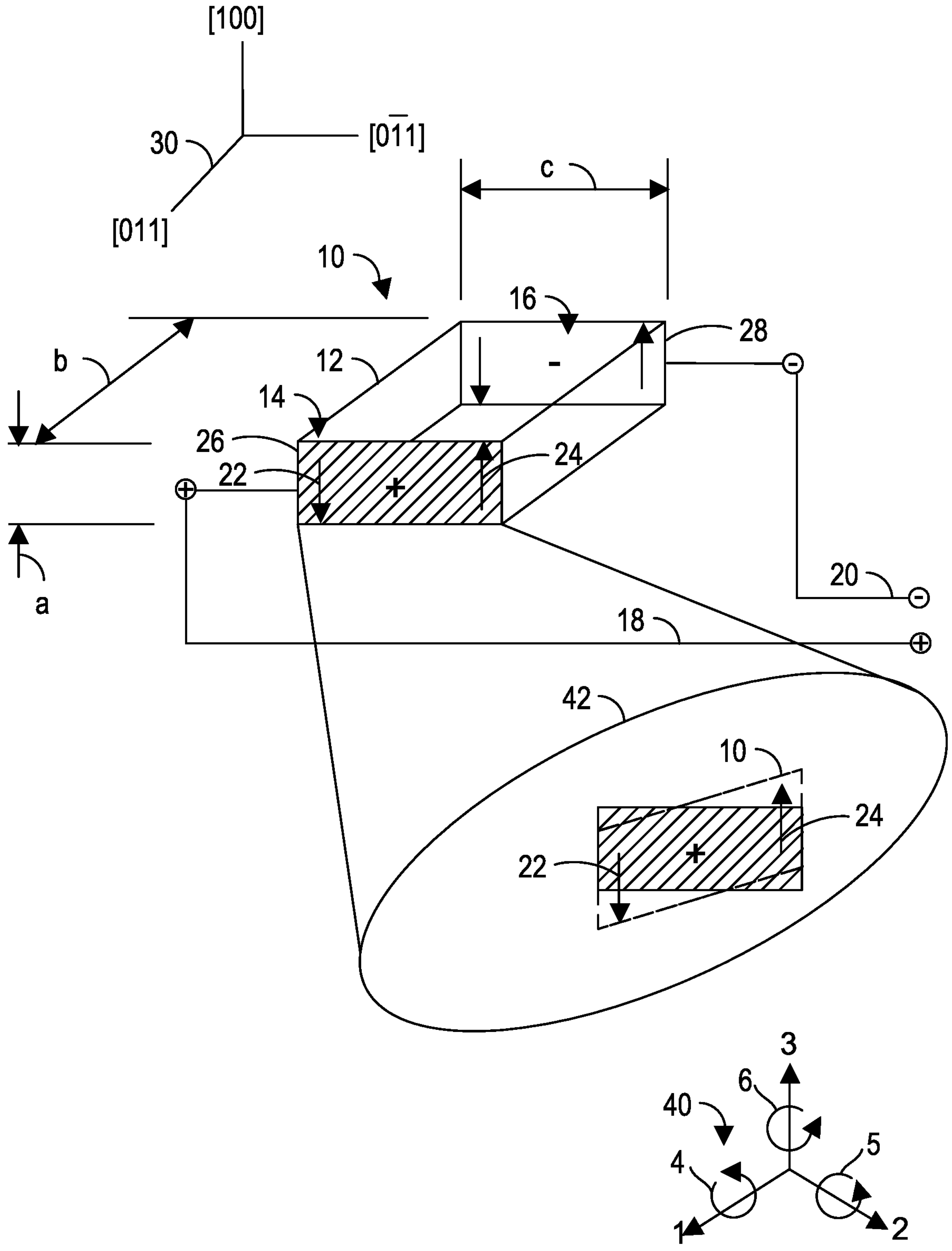
FIG. 1 is a first shear mode example in accordance with an embodiment of the present disclosure.
Figure 2:
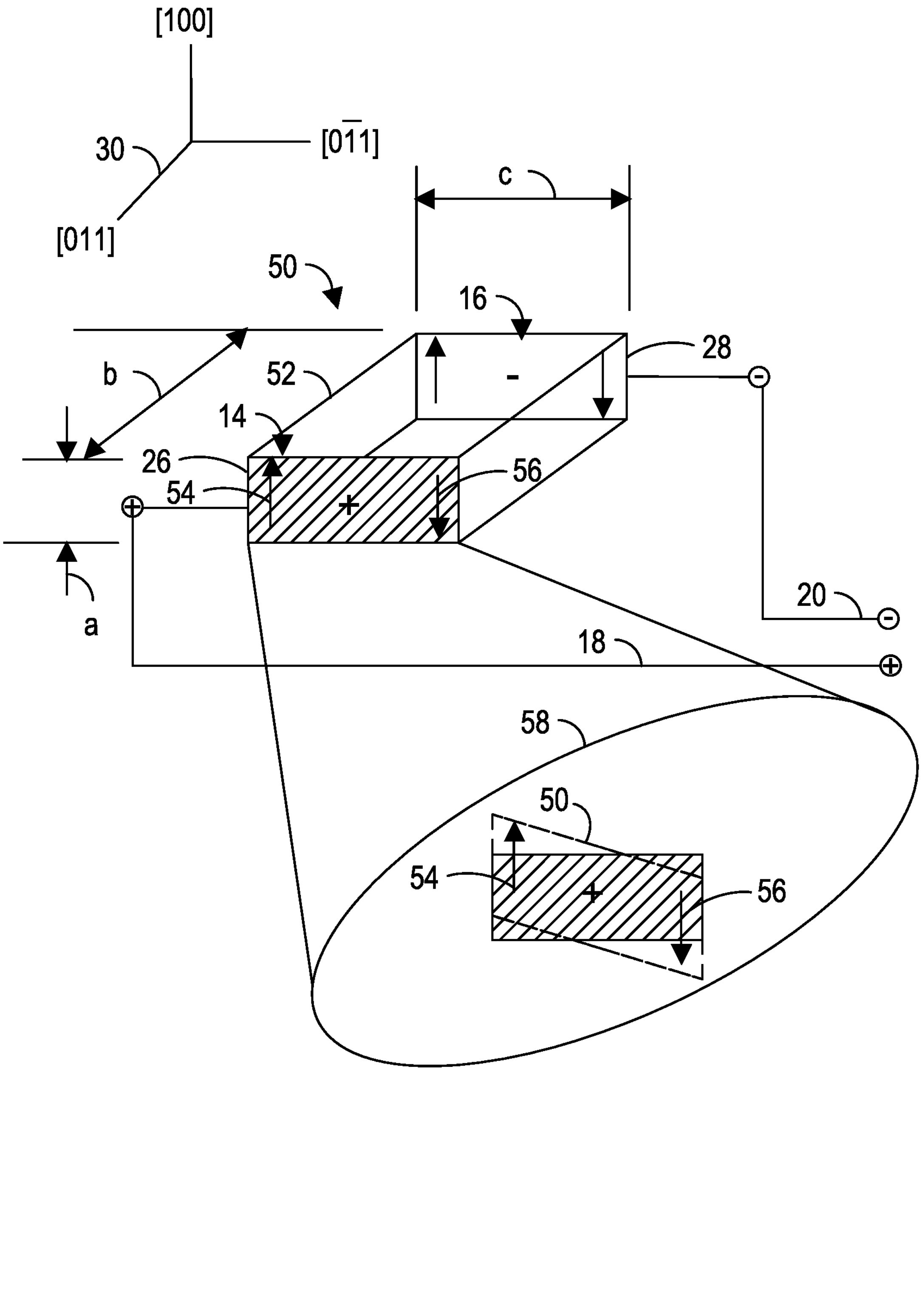
FIG. 2 is a second shear mode example in accordance with an embodiment of the present disclosure.
Figure 3:
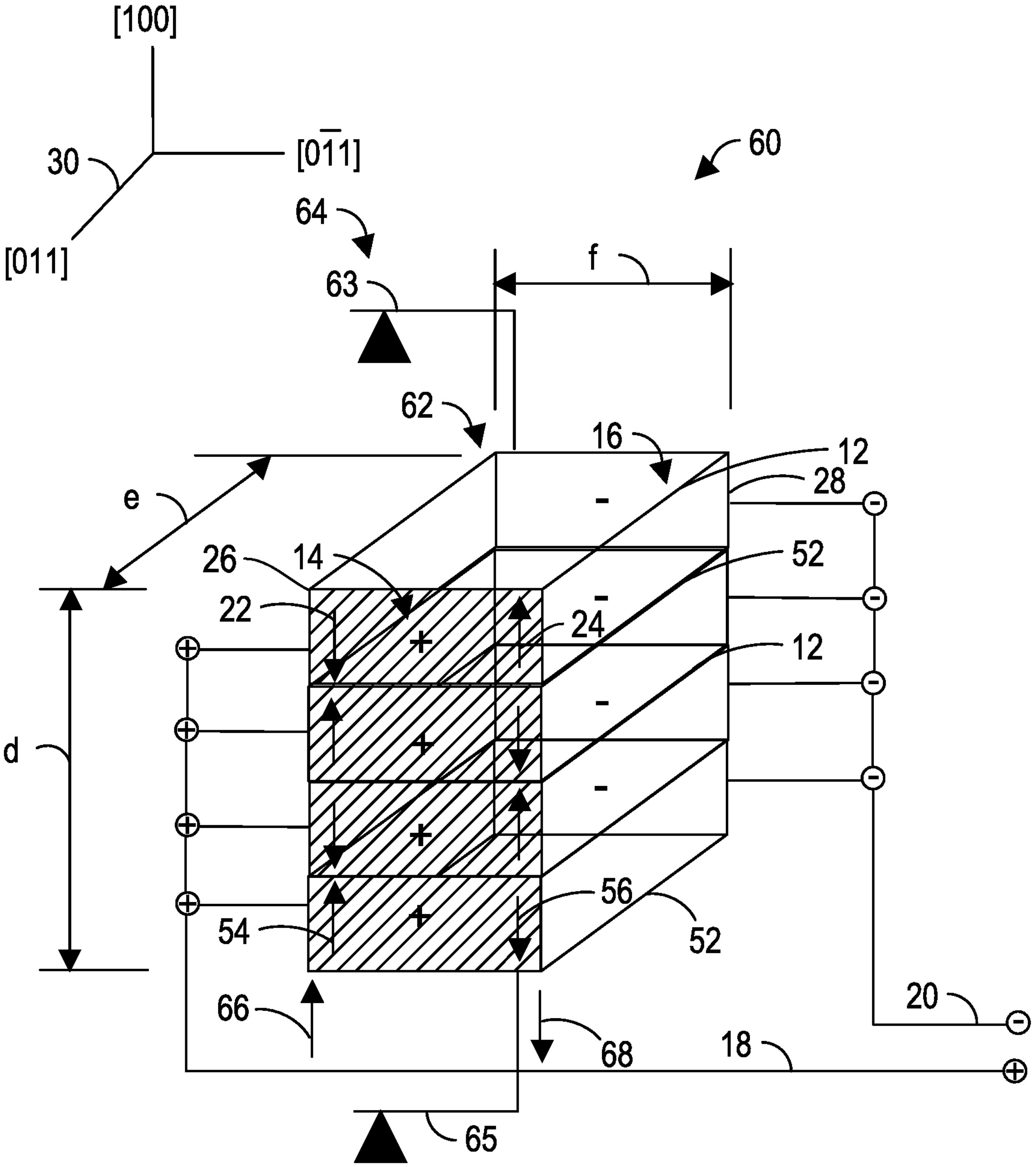
FIG. 3 is a first shear mode transducer in accordance with an embodiment of the present disclosure.
Figure 4:
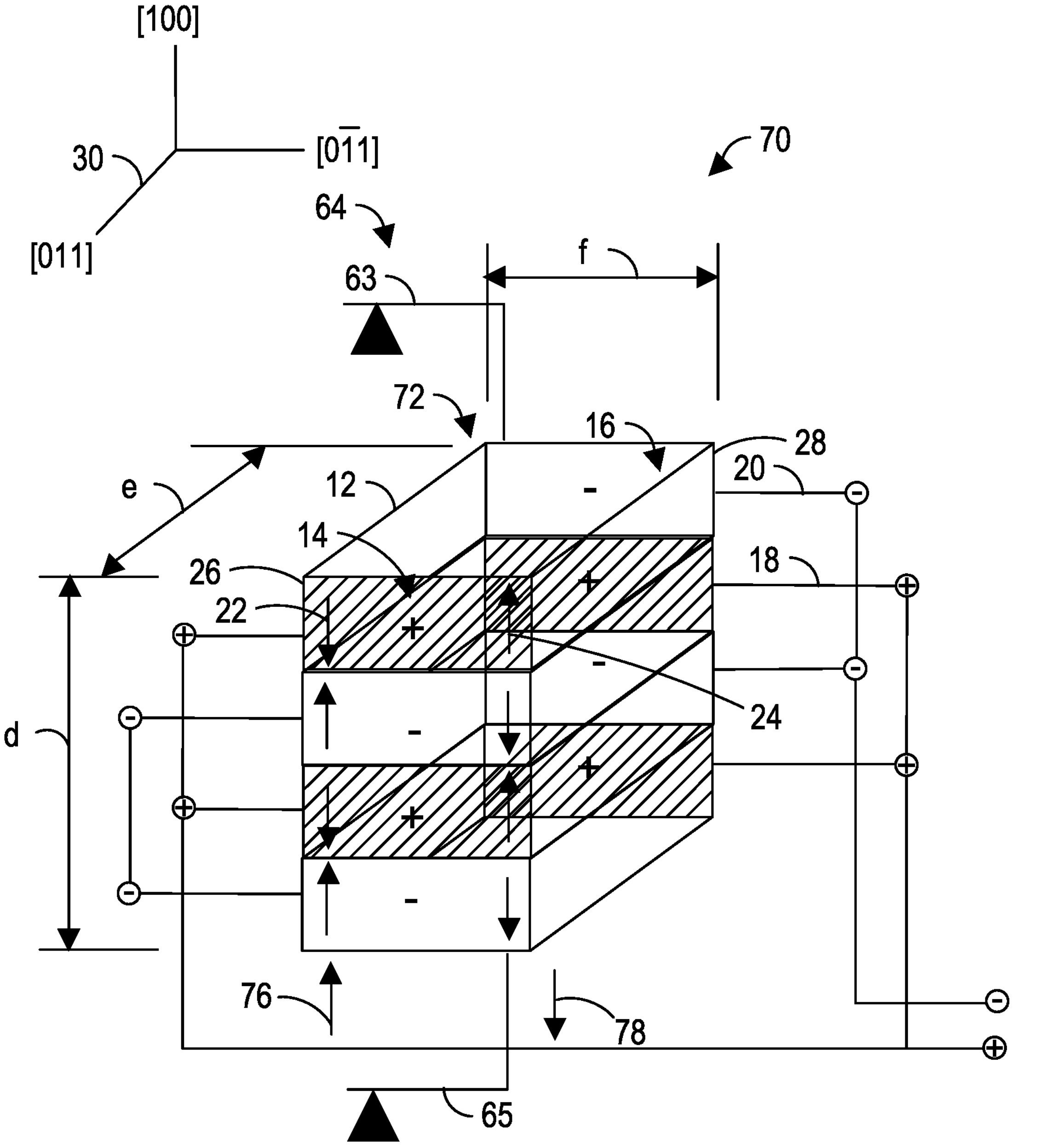
FIG. 4 is a second shear mode transducer in accordance with an embodiment of the present disclosure.
Figure 5A:
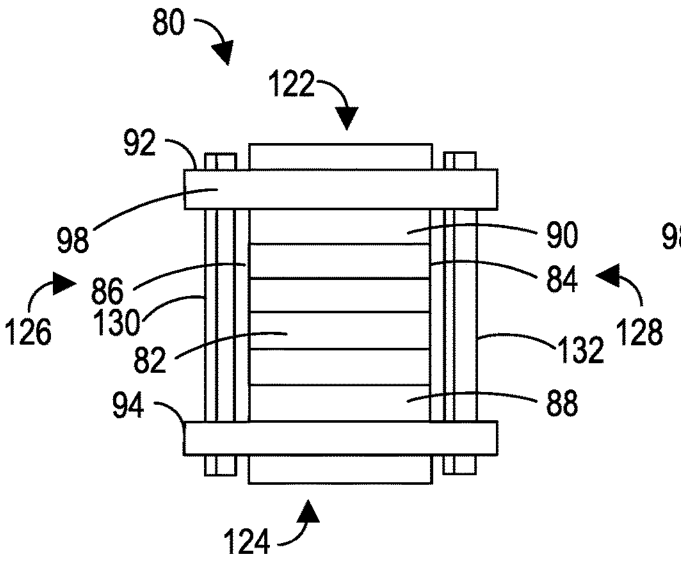
FIGS. 5A, 5B, and 5C provide different views of an electroacoustic flexural bender bar transducer in accordance with an embodiment of the present disclosure.
Figure 5B:
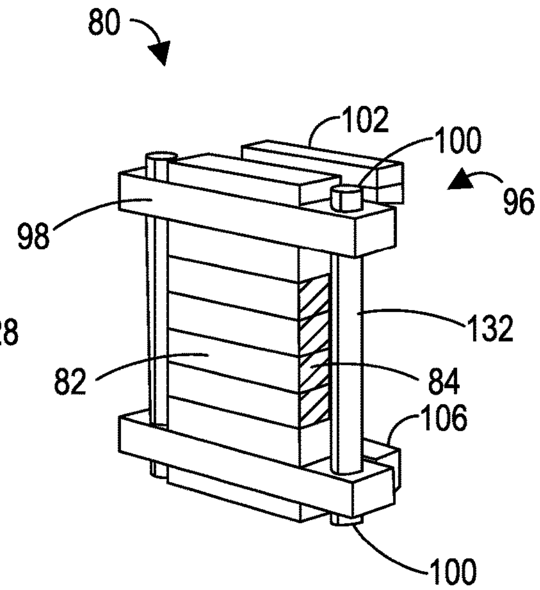
Figure 5C:
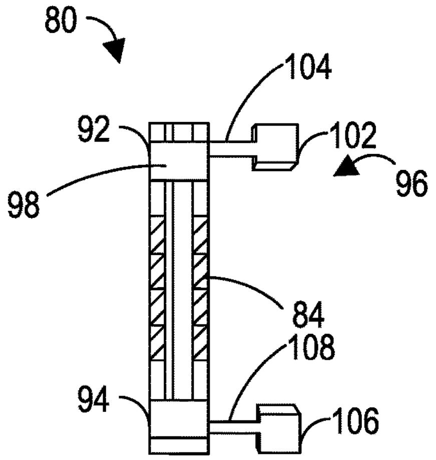

The general concept of utilizing the shear mode to excite the longitudinal-flexure motion is illustrated in FIG. 1 and FIG. 2. In particular, FIG. 1 and FIG. 2 shows first and second examples, respectively, of a piezoelectric single crystal element operating in a $d_{36}$ shear mode. Two exemplary configurations of the $d_{36}$ shear mode piezoelectric single crystals in a device comprising a shear mode transducer are illustrated in FIG. 3 and FIG. 4. In particular, FIG. 3 depicts a first shear mode transducer stack formed with $d_{36}$ shear mode piezoelectric single crystals layered with alternating cutting directions. FIG. 4 depicts a second shear mode transducer stack formed from $d_{36}$ shear mode piezoelectric single crystals layered with a single cutting direction. The exemplary shear mode transducers may be included in various electroacoustic devices. FIGS. 5A, 5B, and 5C show an example of a shear mode transducer of the present disclosure integrated in an electroacoustic flexural bender bar. In operation, a voltage difference is provided between a plurality of electrodes arranged on opposing first and second outer faces of the transducer stack. The voltage difference simultaneously induces an expanding and contracting motion due to the resultant shear strain in the piezoelectric single crystals, thereby inducing the longitudinal-flexure electromechanical motion that is utilized as a low frequency transduction mode of operation.

For reference, a first coordinate system 30 is shown in FIG. 1 and throughout that represents crystallographic axes. The convention used in describing the properties of piezoelectric materials is to define a direction of poling as the z-axis irrespective of the specific crystallographic direction. In one example, the poling direction describes a direction by which electric current is applied to a piezoelectric single crystal during formation of a poled piezoelectric crystal element (e.g., during domain engineering).

The first coordinate system 30 includes a z-axis or [011] cubic axis (c), an x-axis or $[0\bar{1}1]_c$ axis, and a y-axis or $[100]_c$ axis.

The shear mode transducer and methods disclosed herein utilize domain-engineered piezoelectric crystal elements that are cut at a specific coordinate rotation angle to induce longitudinal-flexural motion from a beam such as a bender bar. FIG. 1 shows a first piezoelectric crystal element 12 illustrating a first shear mode example 10. In one example, the first piezoelectric crystal element 12 is a piezoelectric single crystal that is poled along the $[011]_c$ axis and cut at a zxt+45° coordinate rotation angle. Alternatively, the first piezoelectric crystal element 12 may be poled along a. direction and cut at a zxt+225° coordinate rotation angle.

Poling and cutting a piezoelectric single crystal in this way produces a 36-shear mode (also called a $d_{36}$ shear mode) piezoelectric crystal element. 36-shear mode is also known as 36-mode bending and $d_{36}$ shear mode. For reference, a second coordinate system 40 shows a first axis 1, a second axis 2, and a third axis 3. In 36-shear mode, an electric field applied along the third axis 3 induces bending around the third axis 3, shown by arrow 6. 36-shear mode piezoelectric single crystals offer high transverse piezoelectric coefficients and superior electromechanical properties, which are discussed in more detail below.

The first piezoelectric crystal element 12 is a rectangular prism having a thickness of dimension a, a length of dimension b, and a width of dimension c. Dimensions of the piezoelectric material may be controlled based on desired electrical, mechanical, and acoustic properties of the application. In some examples, the piezoelectric material geometry may deviate from that of a rectangular prism as long as it can excite shear modes of vibration.

First piezoelectric crystal element 12 includes a first electrode 14 provided on a first outer face 26, and a second electrode 16 provided on a second outer face 28. Piezoelectric materials include single crystal materials such as lead magnesium niobate-lead titanate (PMN-PT); lead zirconate niobate-lead titanate (PZN-PT); lead indium niobate-lead magnesium niobate-lead titanate (PIN-PMN-PT); lead magnesium niobate-lead zirconate titanate (PMN-PZT); manganese doped-PIN-PMN-PT; and manganese doped-PMN-PZT or the like. Other piezoelectric materials can also be used. The first electrode 14 and the second electrode 16 are arranged to provide voltage aligned with the poling direction of the first piezoelectric crystal element 12. In other words, the electrodes are perpendicular to the $[011]_c$ axis or z-axis. In one example, the first electrode 14 may be configured to be coupled to a positive voltage source 18 and the second electrode 16 may be configured to be coupled to a negative voltage source 20. Electrodes can be disposed on the piezoelectric materials by a variety of methods including silk screening, electroless nickel plating, electroplating, sputtering, and adhesion.

A first inset 42 demonstrates shear for a piezoelectric crystal element operating in the 36-shear mode that is cut at a coordinate rotation angle of zxt+45° or zxt+225°. An application of a voltage difference between the first electrode 14 and the second electrode 16 induces shear motion in a first strain direction 22 and a second strain direction 24. For example, the first strain direction 22 may direct downward and the second strain direction 24 may direct upward along the $[100]_c$ axis or y-axis. The voltage difference is transmitted along a working direction of the first electrode 14 and the second electrode 16, which is parallel to the.

axis. In this way, as the applied electric field is in the poling direction, there is minimal risk of de-poling the crystal, which allows for much higher AC electric field and is ideal for high drive level underwater electroacoustic projector applications.

FIG. 2 shows a second piezoelectric crystal element 52 illustrating a second shear mode example 50. In the second shear mode example 50, the second piezoelectric crystal element 52 is domain engineered and coordinate rotated to operate as a 36-shear mode piezoelectric single crystal. However in the second shear mode example 50, the second piezoelectric crystal element 52 may be poled along a $[011]_c$ direction and cut at a zxt−45° coordinate rotation angle. Alternatively, the second piezoelectric crystal element 52 may be poled along a. direction and cut at a zxt−225° coordinate rotation angle. Components of FIG. 2 that were previously illustrated and described above shall retain their numbering in FIG. 2.

A second inset 58 demonstrates shear for a piezoelectric crystal element 52 operating in the 36-shear mode that is cut at a coordinate rotation angle of zxt−45° or zxt−225°. As above, an application of a voltage difference between the first electrode 14 and the second electrode 16 induces shear motion. However, in the second shear mode example 50, a first strain direction 54 may direct upward and a second strain direction 56 may direct downward along the $[100]_c$ or y-axis.

In FIG. 3, a first shear mode transducer 60 comprising a first transducer stack 62 is illustrated. The first transducer stack 62 comprises a plurality of shear mode piezoelectric crystal elements 52. The first transducer stack 62 includes the first electrode 14 provided on the first outer face 26 of each shear mode piezoelectric element 52 and the second electrode 16 provided on the second outer face 28, the second outer face 28 opposing the first outer face 26. In one example, the first electrode 14 is configured to be coupled to the positive voltage source 18 and the second electrode 16 is configured to be coupled to the negative voltage source 20. Components of FIG. 2 that were previously illustrated and described above shall retain their numbering in FIG. 2.

In manufacturing the transducer stack, first the piezoelectric material is cut, provided with electrode, and then poled based on drawings and fabrication specifications and acceptance criteria to provide piezoelectric elements. Piezoelectric elements must be combined utilizing adhesive and appropriate compressive stress. Fixtures and tools are generally utilized to control this process. Piezoelectric single crystals are temperature sensitive and experience de-poling at relatively low temperatures compared to piezoelectric ceramics. Electrical leads must therefore be cold soldered to the electrodes of the piezoelectric single crystals. The elements combined as a shear mode transducer must have mechanical boundary conditions suitable for longitudinal flexure bending motion such as fixed-fixed or simply supported boundary conditions. This will allow an effective bending motion from the assembly when excited with an alternating voltage or electric field.

In one example, the first shear mode transducer 60 may be integrated in an electroacoustic flexural bender bar. However, other suitable application are imagined. In one example, the first shear mode transducer 60 may include a frame or support 64. The support 64 may provide mechanical boundary conditions for the first transducer stack 62. For example, flexural beams with fixed-fixed or simply supported mechanical boundary conditions may exploit the shear mode of vibration described herein thereby inducing longitudinal-flexural motion in an electroacoustic bender bar transducer. Examples of the support 64 may include compressing the first transducer stack 62 on a first end 63 and a second end 65. Further, the first end 63 and the second end 65 of the support 64 may be mounted, e.g., to a surface. The mechanical boundary conditions provided by the support 64, e.g., the manner of mounting and amount of compressive stress, may be controlled based on desired electroacoustic performance. One example of the support 64 is shown in detail with reference to FIGS. 5A, 5B, and 5C.

In one example, the plurality of shear mode piezoelectric crystal elements comprising the first shear mode transducer 60 are 36-shear mode piezoelectric single crystals. For example, the first shear mode transducer 60 illustrates the first transducer stack 62 where there are both zxt+45° cut and zxt−45° cut, $[011]_c$ poled, piezoelectric single crystals. In the example, a plurality of the first piezoelectric crystal elements 12 (e.g., cut at zxt+45° or zxt+225°) are layered alternating with a plurality of the second piezoelectric crystal element 52 (e.g., cut at zxt−45° or zxt−225°). In some examples, such an arrangement may result in a simple and practical electrical configuration in that all the positive electrodes (e.g., one or more of the first electrode 14) and all the negative electrodes (e.g., one or more of the second electrode 16) are together on their respective side of the first transducer stack 62. An application of a voltage difference between the first electrode 14 and the second electrode 16 induces shear motion in a first strain direction 66 and a second strain direction 68. For example, the first strain direction 66 may direct upward and the second strain direction 68 may direct downward along the $[100]_c$ axis or y-axis. As another example, the first strain direction 66 may represent a contracting side and the second direction 68 may represent an expanding side (or contracting side), which may oscillate in response to an alternating electric drive field.

The first transducer stack 62 is a rectangular prism having a thickness of dimension d, a length of dimension e, and a width of dimension f. However, dimensions of the transducer stack may vary depending on desired electrical, mechanical, and acoustical performance for a given application. For example, the number and the geometry of the piezoelectric crystal elements forming the transducer stack may be selected based on source level, bandwidth, resonance frequency, system requirements, and other factors or performance metrics.

In FIG. 4, a second shear mode transducer 70 comprising a second transducer stack 72 is illustrated. As described above with reference to FIG. 3, the second transducer stack 72 comprises a plurality of shear mode piezoelectric crystal elements. The second transducer stack 72 includes the first electrode 14 provided on the first outer face 26 of each shear mode piezoelectric element and the second electrode 16 provided on the second outer face 28, opposing the first outer face 26. Components of FIG. 4 that were previously illustrated and described above shall retain their numbering in FIG. 4.

In one example, the plurality of shear mode piezoelectric crystal elements comprising the second shear mode transducer 70 are 36-shear mode piezoelectric single crystals. For example, the second shear mode transducer 70 illustrates the second transducer stack 72 where all of the 36-shear mode piezoelectric single crystals are zxt+45° and cut $[011]_c$ poled. Alternatively, the second transducer stack 72 may comprise all zxt−45° cut and $[011]_c$ poled piezoelectric single crystals. For example, the second transducer stack 72 may comprise a plurality of the first piezoelectric crystal elements 12 (e.g., cut at one of zxt+45° or zxt+225°). Alternatively, the second transducer stack 72 may comprise a plurality of the second piezoelectric crystal elements 52 (e.g., cut at one of zxt−45° or zxt−225°). In this configuration, each of the first electrode 14, e.g., one or more positive electrodes, and the second electrode 16, e.g., one or more ground electrodes, neighbor each other on both sides of the second shear mode transducer 70. In one example, this arrangement may include insulating the positive electrodes from the negative electrodes.

An application of a voltage difference between the first electrode 14 and the second electrode 16 induces longitudinal-flexure electromechanical motion in a first strain direction 76 and a second strain direction 78. For example, the first strain direction 76 may direct upward and the second strain direction 78 may direct downward along the $[100]_c$ axis or y-axis. As another example, the first strain direction 76 may represent a contracting side and the second direction 78 may represent an expanding side (or vice versa), which may oscillate in response to an alternating electric drive field.

A method of manufacturing a shear mode transducer, such as the first shear mode transducer 60 and the second shear mode transducer 70, comprises arranging in a single layer a plurality of shear mode piezoelectric crystal elements to form a transducer stack, such as, for example, the first transducer stack 62 or the second transducer stack 72.

The method of manufacture includes cutting each of the plurality of shear mode piezoelectric crystal elements at a coordinate rotation angle of at least one of zxt+45°, zxt−45°, zxt+225° and zxt−225°. A first electrode is then applied to a first outer face of each shear mode piezoelectric crystal element, and a second electrode is applied to a second outer face, opposing the first outer face, such as, for example, the first electrode 14 and the second electrode 16. The plurality of shear mode piezoelectric crystal elements are further prepared by poling each of the crystals along a $[011]_c$ cubic axis.

In an alternate method, domain engineering (or poling) a piezoelectric crystal element may comprise applying temporary poling electrodes along $[011]_c$ cubic axis surfaces (or other crystallographic axis as suits the application) and applying an electrical field strength (e.g., 400-500 V/mm) along the $[011]_c$ cubic axis at room temperature (e.g., 70° F.±20° F.). The poling electrode surfaces may be removed and the piezoelectric crystal element may be mechanically finished with cuttings along zxt±45°, zxt±225°, or other desired coordinate rotation angles, as suits the application. Working electrodes can then be applied to the elements, e.g., the first electrode 14 and the second electrode 16, to each of the piezoelectric crystal elements in alignment with poling direction, e.g., $[011]_c$. However, in other examples, such as shear mode transducers comprising alternative shear modes, e.g., 15-shear mode and/or 24-shear mode, the electrodes may be applied differently.

In one example, the plurality of piezoelectric crystal elements may comprise at least one of a single crystal, a thin film, a textured ceramic, a bulk ceramic, a polycrystalline ceramic, a polymer, and a composite. Manufacturing a shear mode transducer in this way, by utilizing the 36-mode shear motion to excite the "longitudinal-flexure" vibration mode from a single layer of piezoelectric single crystals, greatly simplifies the physical construction of electroacoustic transducer devices manufactured therefrom. This method also allows one to take advantage of the superior material properties of piezoelectric single crystals operating in the 36-shear mode, compared to other piezoelectric materials and modes of operation.

FIGS. 5A, 5B, and 5C show views an electroacoustic flexural bender bar, hereinafter a bender bar transducer 80. The bender bar transducer 80 is shown in FIG. 5A as a front view, FIG. 5B as a side-perspective view, and FIG. 5C as a side view. The bender bar transducer 80 is one example of a shear mode transducer as herein disclosed.

The bender bar transducer 80 comprises a shear mode piezoelectric single crystal transducer stack, hereinafter a transducer stack 82. In one example, the transducer stack 82 may be the same or similar to the first transducer stack 62 and the second transducer stack 72, such as, for example, comprising a plurality of 36-shear mode piezoelectric single crystals. For example, the bender bar transducer 80 comprises four 36-shear mode piezoelectric single crystal segments poled along the $[011]_c$ axis with both zxt+45° and zxt−45° cuts arranged in a bender bar configuration to excite the longitudinal-flexure mode resonance.

In another example, the transducer stack 82 may comprise a plurality of shear mode piezoelectric crystal elements that are one of 15-shear mode piezoelectric single crystals and 24-shear mode piezoelectric single crystals. Other shear modes of operation can be used. The bender bar transducer 80 further includes at least one or a plurality of active electrodes 84 and at least one or a plurality of ground electrodes 86. In one example, the plurality of active electrodes 84 may be the same or similar the first electrode 14, and the plurality of ground electrodes 86 may be the same or similar to the second electrode 16, for example, and may be applied to opposing faces of each piezoelectric crystal element of the stack. The plurality of active electrodes 84 and the plurality of ground electrodes 86 are configured to be coupled to a voltage source, such as positive voltage source 18 and negative voltage source 20, respectively, introduced above with reference to FIGS. 1-4.

Further, the bender bar transducer 80 may include insulating spacers 88, 90 on both ends of the shear mode piezoelectric single crystal segment stack 82, tension rods 130, 132 to secure or compress the single crystal stack 82 and prevent it from entering into a state of tension, end blocks 94, 98 to secure the tension rods 130, 132, shims 104, 108 to connect the bender bar transducer 80 to a fixed housing (at the position indicated by 96.), and clamp blocks 102, 106 on either end that secure the shims to the bender bar transducer and the fixed housing. End blocks 92, 94 and tension bars 130, 132 can compose parts of a frame 98 coupled to the transducer stack 82. In one example, the frame 98 comprises a first block 92 arranged at a top 122 of the transducer stack 82 and a second block 94 arranged at a bottom 124 of the transducer stack 82. A first insulating spacer 88 may be positioned between the first block 92 and the transducer stack 82 at the top 122, and a second insulating spacer 90 may be positioned between the second block 94 and the transducer stack 82 at the bottom 124. The first tension bar 130 is perpendicularly coupled between the first block 92 and the second block 94 on a first side 126 of the transducer stack, and a second tension bar 132 is perpendicularly coupled between the first block 92 and the second block 94 on a second side 128 of the transducer stack 82, the second side 128 opposing the first side 126. The frame 98 may further include a plurality of fasteners 100 joining the first tension bar 130 and the second tension bar 132 to the first block 92 and the second block 94. The frame 98 compresses the transducer stack 82 between the first block 92 and the second block 94.

As shown in FIG. 5B and FIG. 5C, the bender bar transducer 80 can be coupled to structure 96 by clamp blocks 102, 106 and shims 104, 108 joined to frame 98. This allows a simply supported mechanical boundary condition in response to the application of voltage between the plurality of active electrodes 84 and the plurality of ground electrodes 86.

Figure 6A:
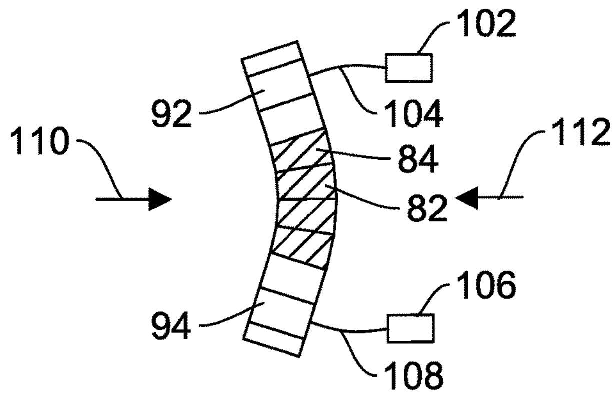
FIGS. 6A and 6B provide diagrams illustrating the bender bar in operation.
Figure 6B:
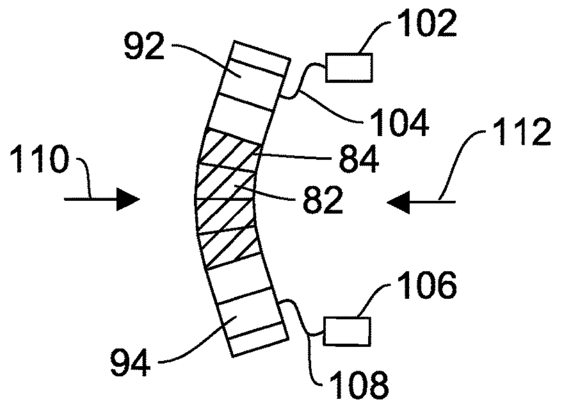

FIGS. 6A and 6B provide diagrams showing an exaggerated operation of the bender bar. When a voltage difference is provided between the electrodes on either side of the transducer stack 82 (e.g., the plurality of active electrodes 84 and the plurality of ground electrodes 86). The voltage difference causes shear mode deformation of the piezoelectric sections. This causes opposing sides of the transducer stack 82 to shorten or lengthen and curve the stack. For example, in response to applying voltage between the plurality of active electrodes 84 and the plurality of ground electrodes 86, in FIG. 6A the bender bar transducer 80 may generate contracting actuation on the side indicated by an arrow 110 and expanding actuation on the side indicated by an arrow 112. The shims 104 and 108 bend to allow this curvature. The tension bars 130 and 132 (not shown) also bend and allow curvature of the transducer stack 82. Further, the blocks 92, 94; and the insulating spacers 88, 90 move with the transducer stack 82. FIG. 6B shows opposite application of voltage to electrodes 84 and ground electrodes 86 resulting in expanding actuation of the side indicated by arrow 110 and contracting actuation of the side indicated by arrow 112.

Further, an alternating voltage difference can be applied between the electrodes, thereby inducing vibration. For example, an alternating electric drive field to the electrodes of the bender bar transducer 80 may simultaneously induce an expanding and contracting motion due to the resultant shear strain in the piezoelectric single crystals. The expanding and contracting motion in the bender bar transducer 80 translates into a longitudinal flexure motion that is utilized as a low frequency transduction mode of operation. The alternating electric drive field may allow a user to control oscillation of the longitudinal-flexure motion and, consequentially, the operating frequency of the acoustic pressure wave emitted from the bender bar transducer 80. The acoustic pressure wave from the bender bar transducer 80 is thus controlled via alternating electrical drive excitation and can be utilized for underwater sound applications.

Figure 7:
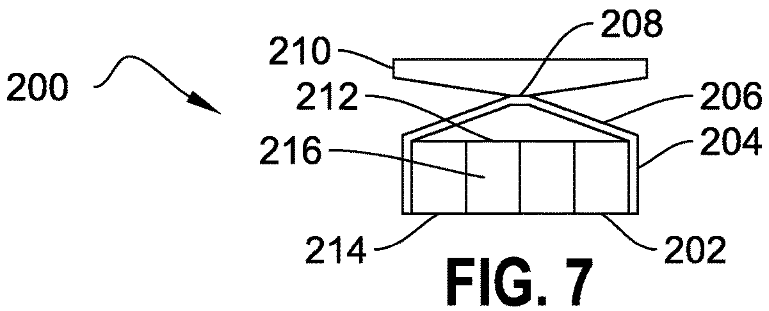
FIG. 7 shows an X spring transducer embodiment of the present disclosure.

FIG. 7 shows an embodiment of an X spring transducer 200 utilizing a bending mode transducer stack 202. Transducer stack 202 is positioned in a frame 204. Arms 206 are joined to frame 204 and to each other at a base 208. A piston 210 or radiator is joined to base 208. Transducer stack 202 is positioned with a forward surface 212 of stack 202 proximate to arms 206 and a back surface 214 of stack 202 distal from arms 206. Electrodes 216 can be provided in electrical contact with transducer stack 202 on the obverse side and on the reverse side. In other embodiments, additional arms and an additional piston can be joined to frame 204 proximate to back surface 214 of transducer stack 202. Spacers can also be provided between transducer stack 202 and frame 204. Likewise, spacers can be provided among separate elements of stack 202.

Figure 8A:
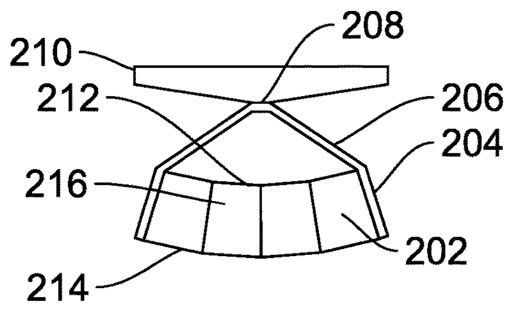
FIGS. 8A and 8B provide diagrams illustrating the X spring transducer in operation.
Figure 8B:
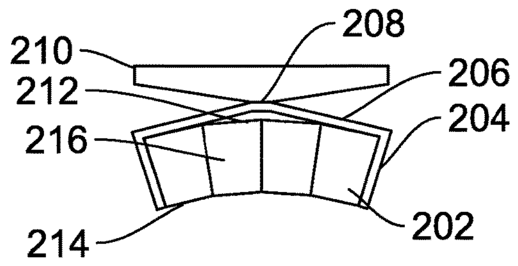

FIGS. 8A and 8B are diagrams that show activation of X spring transducer 200 with a first electrical difference provided across stack 202 in FIG. 8A, and a second electrical difference provided across stack 202 in FIG. 8B. First electrical difference between obverse and reverse electrodes causes shortening of forward surface 212 of stack 202. Frame 204 moves with the stack 202 reducing the distance between arms 206 where they contact frame 204. Base 208 constrains arms 206 to pivot and move base 208 away from forward surface 212. Piston 210 moves outward with base 208.

In FIG. 8B, second electrical difference between obverse and reverse electrodes causes lengthening of forward surface 212 of stack 202. Frame 204 moves with stack 202 increasing the distance between arms 206 where they contact frame 204. Base 208 constrains arms 206 to pivot and move base 208 towards forward surface 212. Piston 210 moves inward with base 208. Application of an alternating electrical difference between the obverse and reverse electrodes will result in vibration of piston 210.

Figure 9:
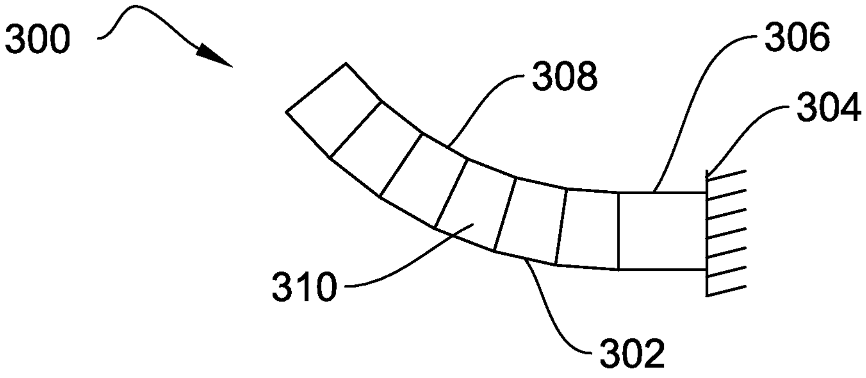
FIG. 9 shows a cantilever transducer embodiment of the present disclosure.

FIG. 9 is a diagram of a cantilever beam transducer 300 incorporating a bending mode stack 302 having piezoelectric elements. Cantilever beam transducer 300 is mounted to a fixed surface 304. An inactive base 306 can be positioned between fixed surface 304 and stack 302. Spacers (not shown) can be positioned between piezoelectric elements 308 or at the distal end of stack 302. Electrodes 310 are provided on the obverse and reverse side of stack 302. Electrical differences between electrodes will cause upward and downward curvature of stack 302.

By using piezoelectric shear modes of vibration to induce longitudinal-flexural electromechanical motion, the disclosed shear mode transducer and methods therefor may be formed from a single layer of reversed polarized piezoelectric material operating with shear motion, such as, for example, 36-shear mode, but also 15-shear mode, 24-shear mode, and other shear modes. This simplifies construction by forming a single layer of piezoelectric elements poled in a single direction, as opposed to piezoelectric elements arranged in two layers, or a single layer of double-poled piezoelectric elements, as is known conventionally. Construction is further simplified by allowing working electrode application to outside surfaces of the transducer stack, as opposed to application between the two layers.

Moreover, using shear motion (e.g., 36-shear mode) derived from piezoelectric single crystal material systems poled along $[011]_c$ crystallographic orientation that have undergone zxt±45° or zxt±225° coordinate rotation to excite longitudinal-flexure mechanical motion offer enhanced material properties and performance advantages when properly incorporated into underwater electroacoustic bender bar transducers as compared to other applied piezoelectric materials such as polycrystalline and textured ceramic material systems. For example, 36-mode piezoelectric single crystals demonstrate piezoelectric strain (or d, which is a ratio of strain to the electric field voltage) an order of magnitude greater than more commonly utilized 31-mode and 33-mode piezoelectric elements, resulting in greater electromechanical or acoustic power output for a given electrical input. Additionally, 36-shear mode piezoelectric single crystals have a high elastic compliance coefficient, which implies reduced device size and weight for a given resonant frequency, or vice versa. Further, 36-shear mode piezoelectric single crystals have a high electromechanical coupling coefficient, which implies greater electroacoustic efficiency and enhanced operating frequency bandwidth. Such qualities are conducive to transducer design in a number of ways, such as, for example, low frequency applications, and producing compact devices.

15-shear mode, 24-shear mode, and 36-shear mode are known existing piezoelectric shear modes of vibration that could perform the desired feature of inducing longitudinal-flexural motion. Other shear modes of vibration in piezoelectric materials aside from 15-shear mode, 24-shear mode, and 36-shear mode may exist and be used to perform the desired feature of inducing longitudinal flexural motion. Other possible shear modes could include the 14-shear mode, 16-shear mode, 25-shear mode, 26-shear mode, 34-shear mode, and 35-shear mode. From an application perspective, the 36-shear mode allows the electric field direction to be in the same as the poling direction, so there is reduced likelihood of de-poling the crystal elements. This property allows for much higher AC electric field and is ideal for high drive level underwater electroacoustic projector applications. Conversely, the 15-shear or 24-shear modes require the field direction to be perpendicular to the poling direction, which may cause de-poling in the material because large electric fields under high drive conditions have the tendency to re-orient domains and align material polarization to the electric field direction. In some examples,. poled single crystals that exhibit high dis shear modes may be useful for passive acoustic devices, such as vector sensors and accelerometers. However, the 15-shear mode may not be desirable, at least in some cases, for high drive actuators/projectors, because the working electric field is perpendicular to the poling direction and may be subject to depolarization under high electric field drive levels. Therefore, 36-shear mode piezoelectric single crystals may be preferred in a projector or actuator application. However, a similar configuration is possible with the 15-shear mode or 24-shear mode, despite their shortcomings.

The piezoelectric 36-shear mode is unique to piezoelectric single crystals and does not exist in the conventionally used polycrystalline piezoelectric ceramic PZT materials. The literature reports that the 36-shear mode crystals that have undergone zxt±45° or ±225° coordinate rotation produce the maximum value of piezoelectric strain coefficient $d_{36}$. However, there may exist other coordinate rotation angles that allow for the appearance of the piezoelectric strain coefficient $d_{36}$. Moreover, there may exist other coordinate rotation angles that allow for a quantitative increase in the piezoelectric strain coefficient $d_{36}$.

Further variations may include material geometry variations, piezoelectric material property variations, and single crystal variations. For example, the piezoelectric material geometry may deviate from that of a rectangular prism as long as it can excite shear modes of vibration. Further, the dimensions of the piezoelectric material may vary depending on desired electrical, mechanical, or acoustical performance. Compositional differences in material systems change quantities that populate elastic, dielectric, or piezoelectric material property matrices. Material properties of general piezoelectric material systems are sensitive to externally applied fields. For example, electric fields, stress fields, thermal fields, optic fields, and others, may alter the piezoelectric response. Piezoelectric single crystal variations may include using any of generation I (binary systems), II (ternary system), and III (doped ternary systems) to generate the 36-shear mode through domain engineering and coordinate rotation.

Material systems of piezoelectric single crystals have evolved over time and have been designated as generations. Generation 1 (PMN-PT, PZN-PT) include piezoelectric single crystals with enhanced material properties compared to conventionally used piezoelectric materials but with low electrical, thermal, and mechanical stability, thus requiring increased design considerations during engineering development and prior to implementation. Generation 2 (PIN-PMN-PT, PMN-PZT) mitigates the low electrical and thermal stability with compositional changes to piezoelectric single crystal material systems, but does not mitigate the low mechanical stability, thus increasing the implementation of piezoelectric single crystals in transducers. Generation 3 (Mn-PIN-PMN-PT, Mn-PMN-PZT) seeks to mitigate the low mechanical stability with manganese doping. These allow for ubiquitous implementation of piezoelectric single crystals in sonar transducers.

A few examples of shear mode bender bar variations are as follows. As one example, a bender bar may comprise all 36-shear mode piezoelectric single crystals poled along the [011]c axis with zxt±45° coordinate rotation. As another example, a bender bar may comprise all 36-shear mode piezoelectric single crystals poled along the $[011]_c$ axis with zxt−45° coordinate rotation. As a further example, a bender bar may comprise all 36-shear mode piezoelectric single crystals poled along the [110]c axis with both zxt+45° and zxt−45° coordinate rotation. The number of shear mode segments in bender bar may be a different quantity based on desired electrical, mechanical, or acoustical performance. Dimensions of the bender bar may vary depending on desired electrical, mechanical, or acoustical performance. Further variations may include the framing and supporting of the shear mode bender bar. For example, flexural beams with fixed-fixed or simply-supported mechanical boundary conditions may be configured for inducing longitudinal-flexure mechanical motion.

A fixed-fixed mounting application increases the resonance frequency of the longitudinal-flexure vibration mode by a factor of approximately 2. Conversely, simply supported mechanical boundary conditions reduce the resonance frequency of the longitudinal-flexure vibration mode by a factor of 2. Utilizing the frequency bandwidth around the resonance frequency transmits the maximum sound pressure level into the fluid medium. The mechanical boundary condition implemented in a bender bar transducer is chosen based on the desired frequency response characteristics of the underwater electroacoustic transducer. Practical implementation of the fixed-fixed mechanical boundary condition would eliminate the usage of the "shim" in the simply supported case and involve rigid supports at both ends of the transducer stack.

It may be understood that bender bar embodiments may take on a variety of different forms for different electroacoustic performance and applications. Applications may include sensors, actuators, medical diagnostics and therapy, underwater acoustics, and others.

In this way, shear mode transducers and shear mode transducer methods provide approaches for using shear mode deformation in piezoelectric elements to excite longitudinal-flexure electromechanical motion and applying such motion to electroacoustic transducers. The technical effect of the disclosure is simplifying construction of a variety of electroacoustic devices that may be manufactured therefrom and enabling manufacturers to select materials based on desired electrical, mechanical, or acoustical properties.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A shear mode transducer apparatus comprising:

at least a first shear mode piezoelectric element poled along a single direction and having a first outer face and an opposed second outer face;

a first set of electrodes with a first electrode applied to the first outer face of said first shear mode piezoelectric element, and a second electrode applied to the opposed second outer face of said first shear mode piezoelectric element;

at least a second shear mode piezoelectric element poled along a single direction and having a first outer face and an opposed second outer face; and a second set of electrodes with a third electrode applied to the first outer face of said second shear mode piezoelectric element, and a fourth electrode applied to the opposed second outer face of said second shear mode piezoelectric element;

said at least one first shear mode piezoelectric element is arranged in a stack with said at least one second shear mode piezoelectric element such that said first set of electrodes is in the same plane as said second set of electrodes wherein application of a voltage difference between said first set of electrodes and said second set of electrodes induces longitudinal-flexure electromechanical motion of the stack;

wherein:

the first electrode is in the same plane as the third electrode and in electrical contact with the third electrode; and the second electrode is in the same plane as the fourth electrode and in electrical contact with said fourth electrode;

wherein application of a voltage difference between the first electrode and the second electrode induces longitudinal-flexure electromechanical motion in the stack; and wherein said first shear mode piezoelectric element and said second shear mode piezoelectric element are layered in the stack with alternating coordinate rotation angles selected from a zxt+45° and zxt-45° pair and a zxt+225° and zxt-225° pair.

2. The apparatus of claim 1 further comprising:

a first end block arranged at a top of the stack;

a second end block arranged at a bottom of the stack;

a first tension rod perpendicularly coupled to said first end block and said second end block on a first side of the stack;

a second tension rod perpendicularly coupled to said first end block and said second end block on a second side of the stack, the second side on the opposite side of the stack from the first side, wherein said first end block, said second end block, said first tension rod and said second tension rod are positioned to compress the stack between said first end block and said second end block;

a first flexible shim coupled to said first end block;

a first clamp block coupled to said first flexible shim;

a second flexible shim coupled to said second end block; and a second clamp block coupled to said second flexible shim, said first clamp block and said second clamp block being mountable to a fixed external structure.

3. The apparatus of claim 1 further comprising:

a first member positioned on a first end of the stack;

a first leg having a distal end and a proximal end joined to said first member at a proximate end and oriented along the stack and separated therefrom;

a second member positioned on a second end of the stack;

a second leg joined to said second member at a proximate end and oriented along the stack and separated therefrom, said second leg distal end being joined to said first leg distal end; and a radiator joined to said first leg and said second leg at the joined distal ends thereof wherein longitudinal-flexure electromechanical motion of the stack causes movement of said radiator toward and away from said stack.

4. A shear mode transducer apparatus comprising:

at least a first shear mode piezoelectric element poled along a single direction and having a first outer face and an opposed second outer face;

a first set of electrodes with a first electrode applied to the first outer face of said first shear mode piezoelectric element, and a second electrode applied to the opposed second outer face of said first shear mode piezoelectric element;

at least a second shear mode piezoelectric element poled along a single direction and having a first outer face and an opposed second outer face; and a second set of electrodes with a third electrode applied to the first outer face of said second shear mode piezoelectric element, and a fourth electrode applied to the opposed second outer face of said second shear mode piezoelectric element;

said at least one first shear mode piezoelectric element is arranged in a stack with said at least one second shear mode piezoelectric element such that said first set of electrodes is in the same plane as said second set of electrodes wherein application of a voltage difference between said first set of electrodes and said second set of electrodes induces longitudinal-flexure electromechanical motion of the stack;

wherein:

the first electrode is in the same plane as the third electrode and insulated from electrical contact with the third electrode, the first electrode being in electrical contact with the fourth electrode; and the second electrode is in the same plane as the fourth electrode and insulated from electrical contact with said fourth electrode, the second electrode being in electrical contact with the third electrode;

wherein application of a voltage difference between said first electrode and said third electrode induces longitudinal-flexure electromechanical motion in the stack.

5. The apparatus of claim 4 wherein said at least one first shear mode piezoelectric element and said at least one second shear mode piezoelectric element are poled along a $[011]_c$ cubic axis and cut at a coordinate rotation angle of one of zxt+45°, zxt-45°, zxt+225°, and zxt-225°.

6. The apparatus of claim 4 wherein said at least one first shear mode piezoelectric element and said at least one second shear mode piezoelectric element are 36-shear mode piezoelectric single crystals.

7. The apparatus of claim 4 wherein said at least one first shear mode piezoelectric element and said at least one second shear mode piezoelectric element are one of 15-shear mode piezoelectric single crystals and 24-shear mode piezoelectric single crystals.

8. The apparatus of claim 4 further comprising:

a first end block arranged at a top of the stack;

a second end block arranged at a bottom of the stack;

a first tension rod perpendicularly coupled to said first end block and said second end block on a first side of the stack; and a second tension rod perpendicularly coupled to said first end block and said second end block on a second side of the stack, the second side on the opposite side of the stack from the first side, wherein said first end block, said second end block, said first tension rod and said second tension rod are positioned to compresses the stack between said first end block and said second end block.

9. The apparatus of claim 8 further comprising:

a first flexible shim coupled to said first end block;

a first clamp block coupled to said first flexible shim;

a second flexible shim coupled to said second end block; and a second clamp block coupled to said second flexible shim, said first clamp block and said second clamp block being mountable to a fixed external structure.

10. The apparatus of claim 4 further comprising:

a first member positioned on a first end of the stack;

a first leg having a distal end and a proximal joined to said first member at a proximate end and oriented along the stack and separated therefrom;

a second member positioned on a second end of the stack;

a second leg joined to said second member at a proximate end and oriented along the stack and separated therefrom, said second leg distal end being joined to said first leg distal end; and a radiator joined to said first leg and said second leg at the joined distal ends thereof wherein longitudinal-flexure electromechanical motion of the stack causes movement of said radiator toward and away from said stack.

* * * * *